Aug. 23, 1932.  G. DESSAINT  1,873,116

JACK ATTACHED TO THE AXLES OF VEHICLES

Filed June 21, 1929

G. Dessaint
INVENTOR

By: Marks & Clerk
Attys.

Patented Aug. 23, 1932

1,873,116

UNITED STATES PATENT OFFICE

GEORGES DESSAINT, OF PARIS, FRANCE

JACK ATTACHED TO THE AXLES OF VEHICLES

Application filed June 21, 1929, Serial No. 372,716, and in France April 4, 1929.

The present invention relates to fluid-pressure jacks for vehicles and more particularly for self-propelled vehicles; the jacks are attached upon the axles of the vehicle so as to be capable of immediate service at the desired moment without needing any preliminary installation; for example, a jack may be fitted adjacent to each wheel upon the corresponding axle so as to be capable of lifting each wheel separately or several wheels simultaneously. The invention, therefore, relates on the one hand to the method of attaching the jack upon the axle and on the other hand to the construction of the jack itself. The jack proposed is of the telescopic type and the fluid employed may be liquid or gaseous and supplied by any convenient arrangement.

Figure 1:
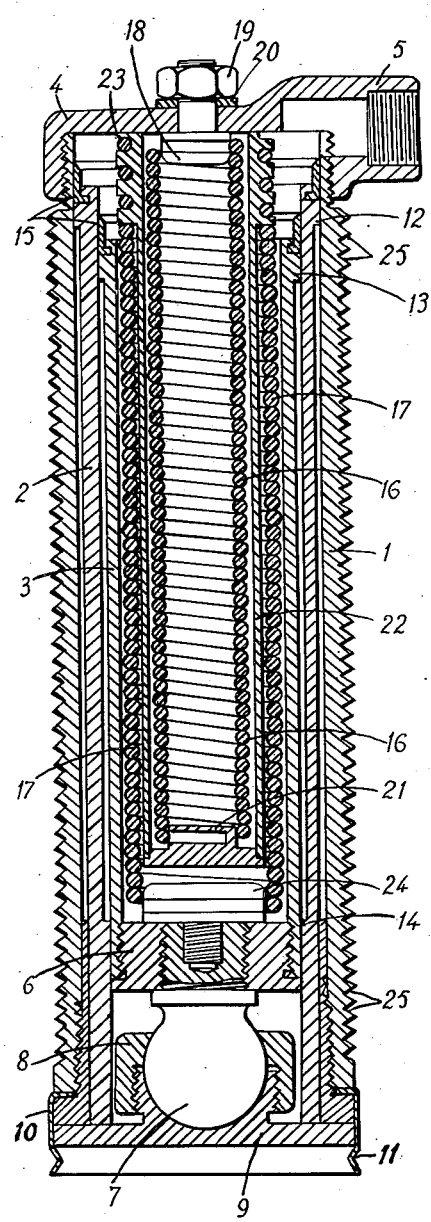
Figure 2:
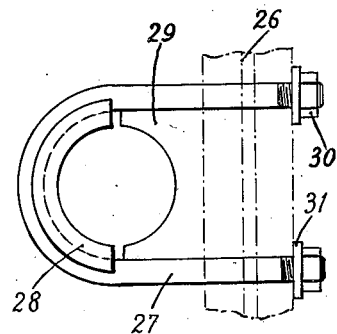
Figure 3:
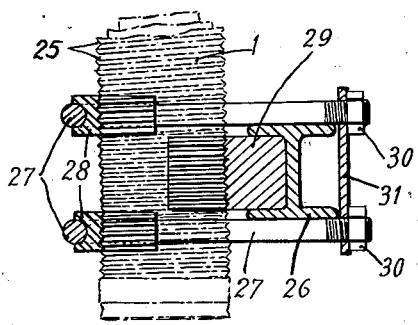
Figure 4:
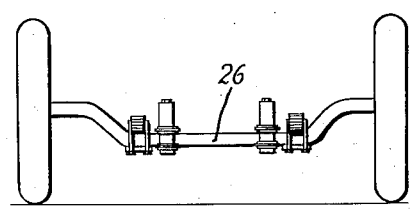

The accompanying drawing shows by way of example one way of carrying out the invention, in which Figure 1 is an axial section of the telescopic jack; Figure 2 is a plan of the member for attaching the jack to the front axle of a vehicle; Figure 3 is a vertical longitudinal section of the member shown in Figure 2; Figure 4 is a diagrammatic view of the front axle of a self-propelled vehicle provided with jacks in accordance with the invention.

The jack comprises a plurality of concentric tubes, in the example shown in Figure 1 there are three such tubes 1, 2 and 3. The cap 4 can be screwed on to the outer tube 1, and is provided with the branch 5 for the fluid supply pipe. The innermost tube 3 is screwed to a member 6 to which is attached a ball 7 capable of movement in the spherical cavity constituted by two members 8 and 9, which are screwed together so as to embrace the ball 7, the member 9 constituting the foot of the jack, which rests upon the ground. Inside the tube 1 and towards the bottom there is screwed a sleeve 10 which holds blade springs 11, the upper ends of which are clamped between the tube 1 and the sleeve 10. The purpose of these springs 11 is to catch into the foot 9 so as to hold it against the sleeve 10 attached to the tube 1.

The intermediate tube 2 can slide inside the tube 1 and is provided at its upper end with an external flange 12 capable of abutting against the sleeve 10, which thus limits the displacement of the tube 2 with respect to the tube 1. The tube 3 can slide inside the tube 2 and is provided at its upper end with an external flange 13, capable of abutting against an internal flange 14 on the lower end of the tube 2, thus limiting the displacement of the tube 3 with respect to the tube 2.

Between the tubes 1 and 2 on the one hand and the tubes 2 and 3 on the other hand are located packing rings 15 on the upper ends of the tubes 2 and 3 to prevent leakage. The telescope tubes 2 and 3 are brought back into their positions of rest by concentrically arranged helical springs 16 and 17. The upper end of the spring 16 is attached to a member 18 secured to the tube 1 by means of the nut 19 and washer 20, which attach the member 18 to the cap 4; the lower end of this spring 16 is attached to a member 21 on the lower end of the tube 22, this tube 22 being located between the two springs 16 and 17. The tube 22 is provided at its upper end with grooves 23 in which the upper coils of the spring 17 engage, its lower end is attached to a member 24, which is screwed into the ball 7, itself in turn screwed into the member 6 attached to the tube 3. Thus the upper end of the spring 16 is attached to the tube 1, whilst the lower end of the spring 17 is attached to the tube 3, the other ends of the springs 16 and 17 being attached respectively to the lower and upper ends of the movable tube 22.

The outside of the tube 1 is provided over its whole length with circular grooves 25 by means of which the jack can be fixed upon the axle 26. This is effected by means of two U-shaped stirrups 27 which embrace the tube 1 of the jack and are located horizontally on either side of the axle 26; the clamping of the jack by the stirrups is effected by means of a semi-cylindrical member 28 abutting against one half of the surface of the jack opposite to the axle, while the other half of the surface abuts against a member 29 located between the stirrups and abutting on the other hand against the H-shaped axle. The members 28 and 29 are provided with grooves similar to the grooves 25 and co-operate with the latter to prevent all sliding along the outer surface of the jack. The tightening up of the stirrups is done by means of the nuts 30, which screw on to the threaded ends of the arms of the stirrups and keep in place vertical plates 31 connecting the corresponding arms of the stirrups 27.

The jack operates in the following way: The injection of fluid by the branch 5 increases the pressure inside the telescopic tubes 1, 2 and 3; this pressure acts especially upwards upon the cap 4 attached to the tube 1 and downwards upon the member 6 attached to the tube 3. Since the tube 1 is fixed to the axle by the clamping stirrups, the tube is forced to move downwards with respect to the tube 1 carrying with it the foot 9, which thus becomes detached from the sleeve 10 by causing the uncatching of the springs 11. At the same time the springs 16 and 17 stretch and the tube 22 moves so as to balance the tension of these springs; the tube 3 can continue to be lowered until the telescopic tubes are completely drawn out, that is to say, until the stop flange 12 on the tube 2 comes into contact with the sleeve 10 and then until the stop flange 13 on the tube 3 comes into contact with the flange 14 on the tube 2; when the fluid is released through the branch 5, the springs 16 and 17 bring back the telescopic tubes, which return into each other and the springs 11 again catch on to the foot of the jack, these springs serving merely for security. It will be noticed that the jack being attached to the axle, the branch 5 should be connected to the fluid pressure system located on the under-frame by a flexible pipe so as to allow for the oscillations of the under-frame with respect to the axle.

It is to be understood that the construction above described and shown in the drawing is only given by way of example and that modifications of detail may be made in it without departing from the scope of the invention; it will be understood that the proposed jack may be attached to any vehicle axle and that the method of attachment is also applicable to any type of jack.

I claim:

In a fluid-pressure jack of the telescopic tubular type for direct attachment to the axles of motor vehicles, a fluid containing casing composed of more than two concentrically arranged telescopic tubes movable longitudinally one with respect to each other and each having a closed end, spring means in said casing for the purpose to return the concentric tubes in their inactive position, said spring means comprising two concentrically arranged tension springs, and a freely movable guide tube between said springs, one end of each spring being attached respectively to the closed end of the outside tube and to the closed end of the inside tube, while the opposite ends of the said springs are attached to the opposite ends of the freely movable guide tube.

In testimony whereof he has signed this specification.

GEORGES DESSAINT.